United States Patent
Sakaguchi et al.

[11] Patent Number: 5,418,440
[45] Date of Patent: May 23, 1995

[54] POSITION CONTROL DEVICE FOR SERVOMOTOR

[75] Inventors: Yoshifumi Sakaguchi; Atsushi Masago, both of Tokyo; Hirokazu Nishikawa; Yasuo Hamano, both of Chiba, all of Japan

[73] Assignee: NEC Corporation, Chiba, Japan

[21] Appl. No.: 220,021

[22] Filed: Mar. 30, 1994

[30] Foreign Application Priority Data

Mar. 31, 1993 [JP] Japan .................... 5-073161

[51] Int. Cl.$^6$ .................................. F15B 9/00
[52] U.S. Cl. ...................... 318/560; 318/561; 318/568.11; 318/610; 318/618
[58] Field of Search ............... 318/560–646, 318/370–380; 388/800–904; 364/160–180

[56] References Cited

U.S. PATENT DOCUMENTS

| | | | |
|---|---|---|---|
| 4,629,949 | 12/1986 | Senso . | |
| 4,633,154 | 12/1986 | Maeda . | |
| 4,774,667 | 9/1988 | Kuraoka et al. | 364/426.02 |
| 4,833,378 | 5/1989 | Furue et al. . | |
| 4,943,759 | 7/1990 | Sakamoto et al. | 318/568.11 |
| 4,958,114 | 9/1990 | Ogawa | 318/616 |
| 5,032,777 | 7/1991 | Ogawa | 318/616 |
| 5,091,683 | 2/1992 | Shimada | 318/561 |
| 5,091,684 | 2/1992 | Iwashita | 318/616 |
| 5,115,418 | 5/1992 | Shimada | 318/616 |
| 5,189,968 | 3/1993 | Eichenser | 318/269 |
| 5,239,248 | 8/1993 | Shimada et al. | 318/568.12 |
| 5,274,314 | 12/1993 | Maqueira | 318/632 |
| 5,304,906 | 4/1994 | Arita et al. | 318/568.16 |
| 5,311,435 | 5/1994 | Yocum et al. | 364/459 |
| 5,325,460 | 6/1994 | Yamada et al. | 388/811 |
| 5,352,961 | 10/1994 | Tajima et al. | 318/561 |

*Primary Examiner*—Paul Ip
*Attorney, Agent, or Firm*—Armstrong, Westerman, Hattori, McLeland & Naughton

[57] ABSTRACT

A position control device for a servomotor in use of a NC machine tool, a robot or the like detects a case that a control shaft is collided with something in error to stop the servomotor at a high speed so as to minimize damages of the machine. When an estimated disturbance torque estimated by a disturbance torque observer 9 is over an allowance disturbance torque, an alarm signal is outputted. At this point, a plugging control unit 11 outputs a braking torque current command in a direction of stopping the servomotor until the servomotor 5 is stopped. An operation mode determination unit 12 receives an operation mode of the machine during the operation to set the allowance disturbance torque corresponding to the operation mode to the determination unit 10. According to the present invention, the detection of the collision of the machine 6 can be performed at higher speed and a braking distance after the detection so that damages of the machine during the motor rotates at a high speed can be minimized.

5 Claims, 11 Drawing Sheets

POSITION CONTROL DEVICE FOR SERVOMOTOR

BACKGROUND OF THE INVENTION

1. Field of the Invention

The present invention relates to a position control device for a servomotor. More particularly, the present invention relates to a position control device for a servomotor in use of a NC machine tool, a robot or the like, which detects an unusual condition at a high speed so as to stop the servomotor in short time to minimize damage of the collision wherein the unusual condition is, for example, a case that a control shaft collides with a work piece in error during the operation.

2. Description of the Prior Art

FIG. 14 is a block diagram showing functions of a position control device for a servomotor. In FIG. 14, a position control unit 2 receives a rotational positioning command Pc for a servomotor 5 from a positioning command producing unit 1 and feeds back a motor rotational position signal Pf from a rotational position detector 7 of the servomotor 5 and then outputs a velocity command Vc to reduce position errors. A velocity control unit 3 feeds back a servomotor rotational velocity signal Vf from a velocity detecting unit 8 and outputs a current command Ic to a current control unit 4 to reduce velocity errors.

In the conventional embodiment mentioned above, the velocity detecting unit 8 calculates the rotational velocity signal Vf by differentiating the position signal received from the position detector disposed on the motor 5. For controlling the position, there is a case that a position of a machine is controlled by the position detector 7 such as a linear scale disposed on a machine, besides the case that a rotation angle position of a feed screw connected to an output shaft of the servomotor 5 such as the conventional embodiment.

A current control unit 4 controls the current to change a torque current of the servomotor to a torque current command Ic. The machine 6 may be a table, a robot arm or the like driven by the servomotor 5. The position control device as a whole controls the machine 6 corresponding to the command from the position command producing unit 1.

A disturbance torque observer 9 receives the torque current command Ic and the motor rotational velocity signal Vf and estimates a disturbance torque applied to the machine 6. A determination unit 10 determines whether the estimated disturbance torque signal TL* is over an allowable disturbance torque signal TLa or not. When the estimated disturbance torque signal TL* is over the allowable disturbance torque signal TLa, the determination unit 10 outputs an alarm signal to the current control unit 4. At this point, the current control unit 4 stops current supply to the motor 5 and stops the servomotor 5.

FIG. 15 is a block diagram showing functions of one structural embodiment of the disturbance torque observer 9. In FIG. 15, the numerals 91 and 93 designate multiplication means and for multiplying a motor torque constant KT, and a total J of an inertia of the servomotor and a load inertia of a motor shaft conversion, respectively. The numeral 92 is subtraction means, The numeral 94 is differential means, and The numeral 95 is a primary filter unit of a time constant T.

A torque constant of the motor is designated by I, the motor torque constant is designated by KT, the total of the inertia of the servomotor and the moment of load inertia of the motor shaft conversion is designated by J, the rotational velocity of the servomotor is designated by Vf, and the disturbance torque is designated by TL. Then, an operational equation of the servomotor is as follows;

$$J \cdot dVf/dt = KT \times I + TL \quad (1)$$

Then, the disturbance torque signal TL is estimated by the following equation which is a transformation of the equation (1).

$$TL = J \cdot dVf/dt - KT \times I \quad (2)$$

The disturbance torque signal TL is estimated by the equation (2) with the current command Ic instead of the torque current I of the servomotor, thereby the block diagram of FIG. 15 stands up. In FIG. 15, a torque signal Tr substantially applied to the motor is calculated by multiplying differential value of the rotational velocity of the servomotor by the inertia J. Thereby, the disturbance torque is calculated by subtracting a producing torque signal Tm of the motor which is multiplied the current command Ic by the motor torque constant KT. And then transitional estimated errors are eliminated through the primary filter 95 to output the estimated torque signal TL* is outputted.

As mentioned above, the disturbance torque observer 9 has a function of taking out an external force which a torque element produced from the servomotor by the torque current command Ic is excluded from the torque regarding to the servomotor 5, wherein the external force is the disturbance torque signal TL. For instance, in a case that a slide or cutting tool driven by the control shaft is collided with any obstruction during the operation of a machine tool cutting the work piece, the disturbance torque signal TL is applied to the servomotor in a direction of preventing rotation. In a case of usual cutting or the like, the disturbance torque signal TL, that is cutting load, is not so large. However, when the control shaft is collided with the work peace in error, a quite large disturbance torque is loaded to the servomotor, differently from in the case of the normal cutting.

Conventionally, the allowance disturbance torque signal TLa is set between a normal value and an abnormal value of the disturbance torque, when the estimated disturbance torque signal TL* is over the allowance disturbance torque signal TLa, the determining unit determines the collision and outputs the alarm signal to the current control unit 4. The current control unit 4, then, shuts out the current supply to the servomotor 5 to prevent the machine 6 from breaking. FIG. 16 shows a relationship between time responses of the estimated disturbance torque at a normal value and at collision and the allowance disturbance torque signal TLa. In FIG. 16, an axis of abscissa designates time, and an axis of ordinate designates torque. In FIG. 16, P designates a normal value, Q designates a time response of the estimated disturbance torque signal TL* at collision and outputs the alarm signal when the estimated disturbance torque signal TL* is over the allowance disturbance torque signal TLa.

As mentioned above, in the position control device for the conventional servomotor, the determining unit 10 determines the collision and shuts out the current supply to the servomotor to prevent the machine from breaking. However, in a case that the servomotor rotates at a high speed, the machine is not always reduced the damage.

That is, there are problems for determining the collision; it is necessary that the allowance disturbance torque signal TLa is set higher than normal; a determining time lag Td is caused between an actual collision and determination of the collision as shown in FIG. 16 by delaying the primary filter eliminating the estimated errors of the disturbance observer. If it is assumed that the rotational velocity of the servomotor is Vf, as the servomotor rotates by Vf×Td, in a case that the determining time lag Td is constant, a rotational volume of the servomotor after collision, that is a braking distance, is increased proportionally to the rotational velocity signal Vf and thereby the damage of the machine 6 is increased. Therefore, at a high speed rotation, there were some cases that the machine 6 was damaged.

SUMMARY OF THE INVENTION

The present invention has been made to solve the foregoing objects, taking the above mentioned into considering.

It is an object of the present invention to provide a position control device for a servomotor which has a plugging control unit so as to reduce a braking time and braking distance of the servomotor wherein the plugging control unit commands the maximum braking torque current allowed by the machine in a direction of stopping the servomotor according to a detection of a collision of the machine.

It is another object of the present invention to provide a position control device for a servomotor which comprises an operation mode detection unit setting an allowance disturbance torque to a determination unit so as to minimize the damage of the machine when a collision is caused in a positioning mode which the servomotor rotates at a high speed wherein the allowance disturbance torque is corresponding to an operation mode of the machine during the operation.

It is an advantage of the present invention to provide a position control device for a servomotor which comprises an operation mode detection unit setting an allowance disturbance torque to a determination unit so as to reduce a time lag of detecting the collision in a positioning mode which the servomotor rotates at a high speed wherein the allowance disturbance torque is corresponding to an operation mode of the machine during the operation.

DESCRIPTION OF THE PREFERRED EMBODIMENTS

First Embodiment

Figure 1:
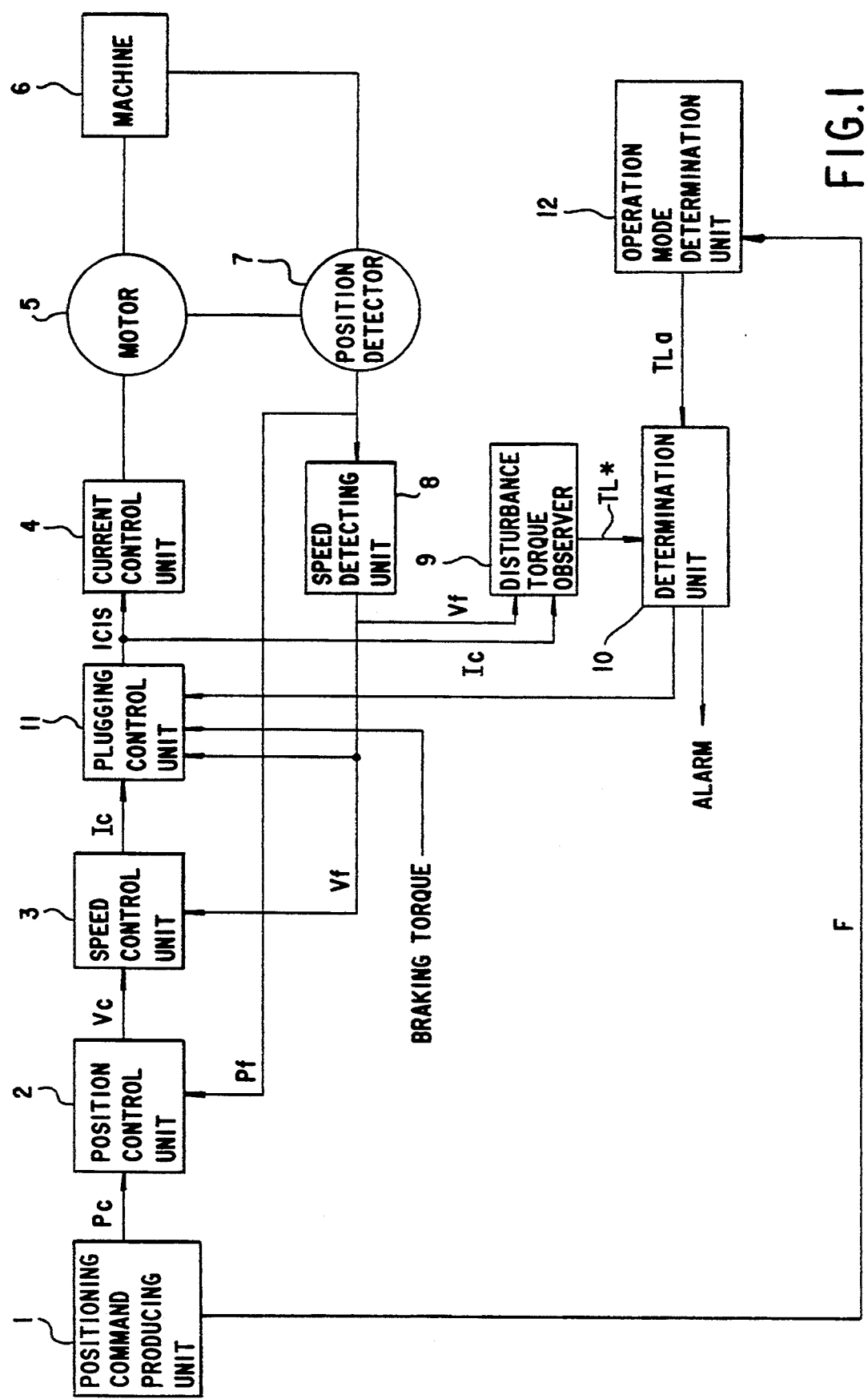
FIG. 1 is a block diagram showing functions of a position control device for a servomotor according to a first embodiment of the present invention.

Preferred embodiments of the present invention will now be described hereinafter with referring to attached figures. FIG. 1 is a block diagram showing functions of a position control device for a servomotor according to a first embodiment of the present invention. Referring to FIG. 1, a position control unit 2 receives a rotational positioning command Pc for a servomotor 5 and feeds back a motor rotational position signal Pf from a rotational position detector 7 of the servomoter 5 and then outputs a velocity command Vc to a speed control unit 3 to reduce position errors.

A velocity control unit 3 feeds back a servomotor rotational velocity signal Vf from a velocity detecting unit 8 and outputs a current command Ic to a current control unit 4 to reduce velocity errors. The velocity detecting unit 8 of this invention calculates the rotational velocity by differentiating the position signal received from the position detector 7 disposed on the motor 5. For controlling the position, there is a case that a position of a machine is directly controlled by the position detector 7 such as a linear scale disposed on a machine 6 as shown by a broken line in FIG. 1, besides the case that rotational position of the servomotor 5 is controlled as the first embodiment.

A current control unit 4 controls current to correspond a torque current of the servomotor 5 with a torque current command Ic. The machine 6 may be a slide, a robot arm (not shown) driven by a feed screw connected to an output shaft of the servomotor 5 or the like. The position control device as a whole controls the machine 6 corresponding with the command of the position command producing unit 1.

Figure 3:
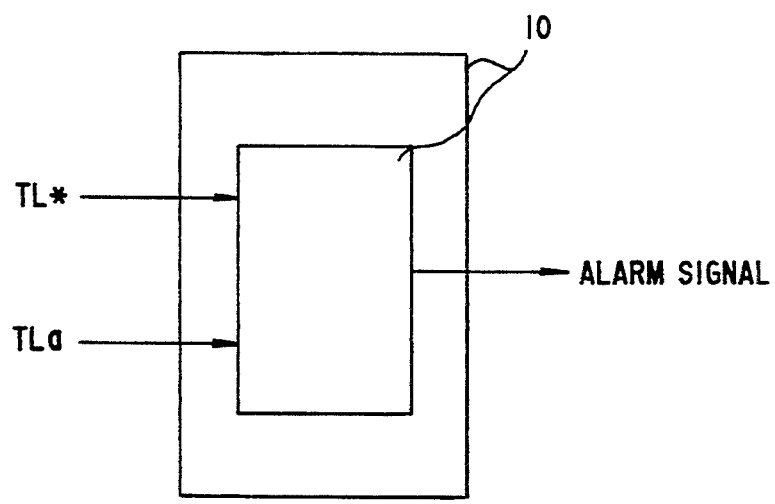
FIG. 3 is a block diagram showing functions of a concrete structural example of a determination unit according to the first embodiment.
Figure 4:
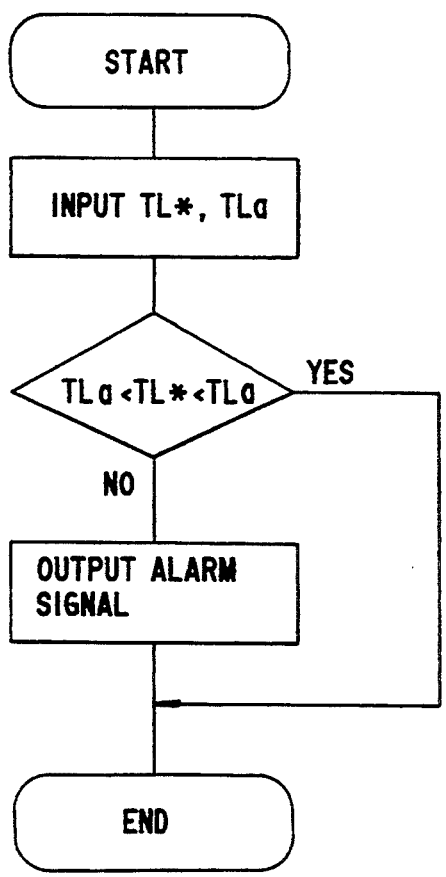
FIG. 4 is a flow chart showing an operational example of the determination unit according to the first embodiment.

A disturbance torque observer 9 receives the torque current command Ic and the servomotor rotational velocity signal Vf to estimate a disturbance torque to be applied to the machine 6. The determination unit 10 determines whether the estimated disturbance torque signal TL* is over an allowable disturbance torque signal TLa or not. When the estimated disturbance torque signal TL* is over the allowable disturbance torque signal TLa, the determination unit 10 outputs an alarm signal to a plugging control unit 11. After receiving the alarm signal, the plugging control unit 11 switches a braking torque current command Is to the normal current command Ic to output to the current control unit 4 until the servomotor 5 is stopped. The determination unit 10 comprises, for example in the concrete, a comparing unit $10_1$ as shown in FIG. 3 and works according to a flow chart shown in FIG. 4. That is, when the estimated disturbance torque signal TL* does not satisfy a relationship of $-TLa<TL*<TLa$, the determination unit 10 outputs the alarm signal.

Figure 5:
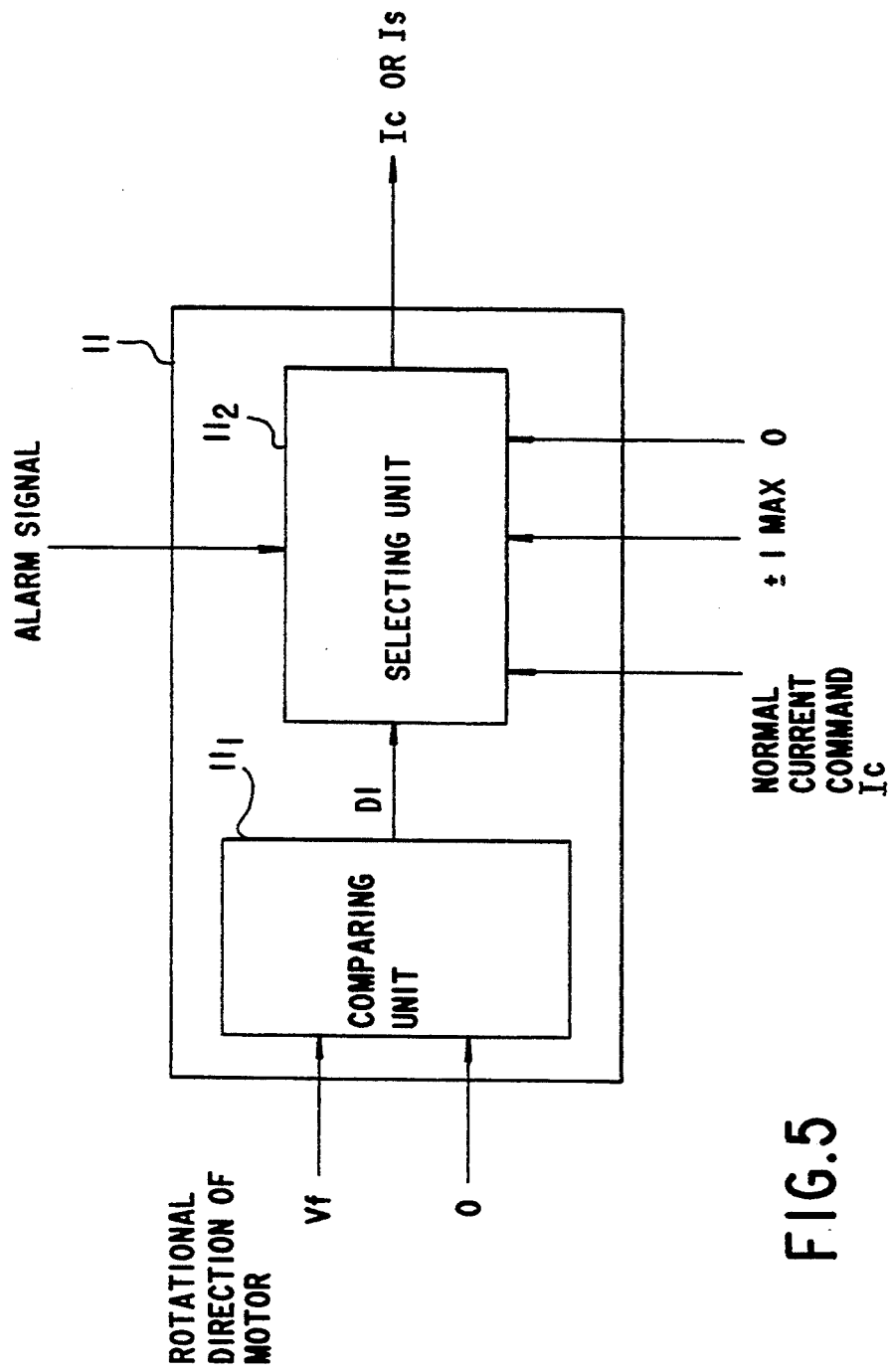
FIG. 5 is a block diagram showing a concrete structural example of a plugging control unit according to the first embodiment.

The plugging control unit 11 comprises, for example in the concrete, a comparing unit $11_1$ and a selecting unit $11_2$ as shown in FIG. 5. According to a flow chart of FIG. 6, an operation of the control device is now be described hereinafter.

Figure 6:
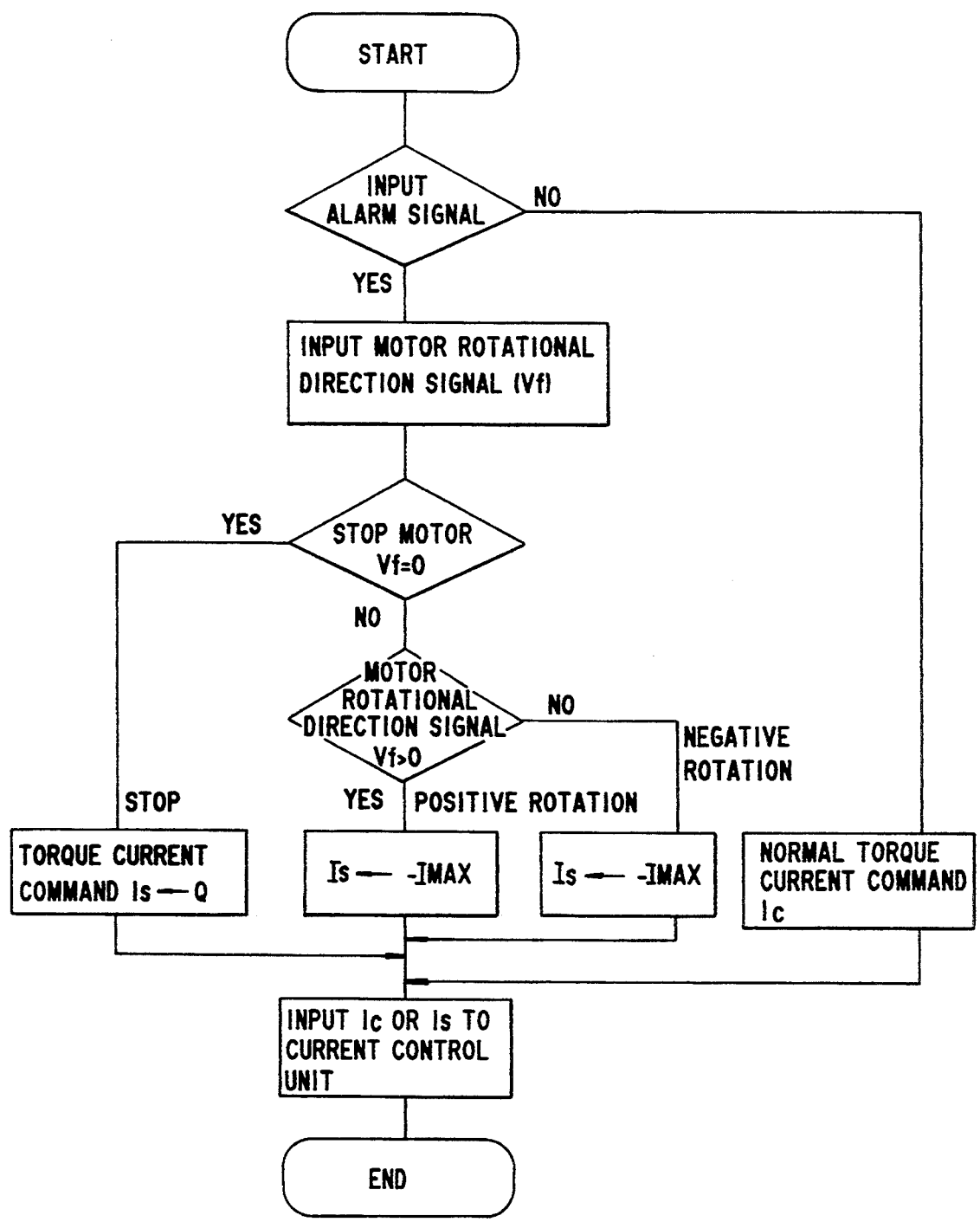
FIG. 6 is a flow chart showing an operational example of the plugging control unit according to the first embodiment.

Referring to FIGS. 5 and 6, the comparing unit receives an original rotational direction of the servomotor 5 through the servomotor rotation velocity signal Vf and then compare the original rotational direction with 0 value as a threshold level to determine a rotational direction. The comparing unit outputs a signal D designating whether the servomotor 5 rotates or not, the rotational direction or that the servomotor 5 is stopped. When the determination unit 10 inputs the alarm signal to the plugging control unit 11, the selecting unit works corresponding to the output signal D of the comparing unit $11_1$.

When the servomotor 5 is stopped or the velocity of the servomotor 5 is 0, 0 signal is outputted as a braking torque current command Is. When the velocity signal Vf of the servomotor 5 is Vf>0, that is a case of a positive rotation, −IMAX is outputted as the braking torque command Is Vf<0. When the velocity signal Vf of the servomotor 5 is Vf<0, that is a case of a negative rotation, +IMAX is outputted.

A process of detecting a collision by the disturbance torque observer 9 is same as a conventional embodiment. The present invention is characterized that the plugging control unit 11 switches the braking torque current signal Is to a normal torque current command Ic to output the braking torque current signal Is to the current control unit 4, after detecting the collision. FIGS. 7A-7D are time charts showing an example of response until the servomotor is stopped.

Figure 7:
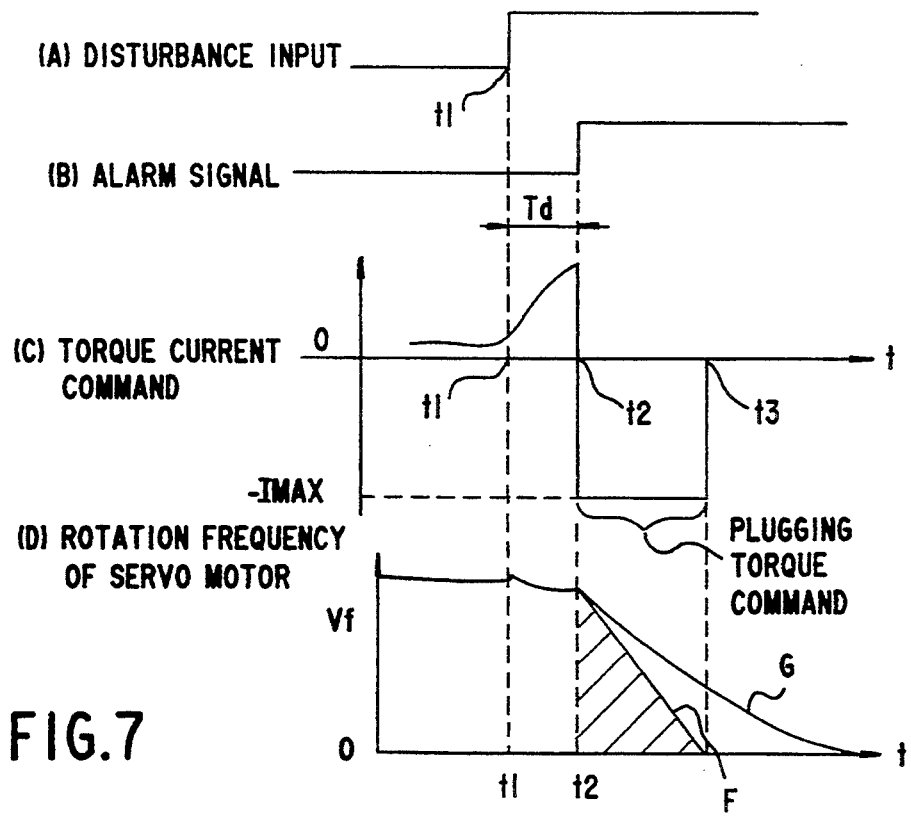
FIGS. 7A–7D are time charts showing an operation of the position control device for the servomotor according to the first embodiment.

Referring to FIG. 7, (A) shows an input locus of a disturbance, the disturbance, the collision is caused at a time t1 and the collision was detected at a time t2 after a determining time lag Td and the alarm signal is outputted as shown in (B). (C) shows the torque current command commanding to the current control unit 4, the plugging control unit 11 switch normal torque current command Ic to the current command −IMAX as the braking torque current command Is in a direction of stopping the servomotor. The current command IMAX is, for example, a torque current value providing an allowance maximum torque of the machine, and is previously set in the plugging control unit 11.

(D) shows a respond of the servomotor rotational velocity signal Vf. In FIG. 7, G is a conventional response and F is a response characteristic of the present invention. As compared with the conventional method shutting out current supply to the servomotor 5 after inputting the alarm signal, the present invention can stop immediately the servomotor at a high speed because the servomotor commands the maximum torque current command which is allowable in a machine condition in the direction of stopping the servomotor 5 so that a rotational volume of the servomotor 5 shown by slashes, that is, a braking distance is minimized after the collision is detected.

In the first embodiment shown in FIG. 1, the device has a operation mode determination unit 12 besides compensate operation according to the feed back. The operation mode determination unit 12 receives an operation mode from the positioning command producing unit 1 and sets the allowance disturbance torque signal TLa corresponding to the operation mode to the determination unit.

In the operation of a machine tool or a robot, there are generally two operation modes; a high speed positioning operation mode which a control shaft is moved to a predetermined position at a high speed, and; a cut feeding mode which a procedure such as cutting is performed at a relatively low speed. In the high speed positioning operation mode, the servomotor rotates at a high speed but the disturbance torque is not so large because the cutting is performed. While, in the cut feeding mode at a relatively low speed, the servomotor rotates at a low speed but the disturbance torque is quite large because of a hard cutting or the like.

Figure 8:
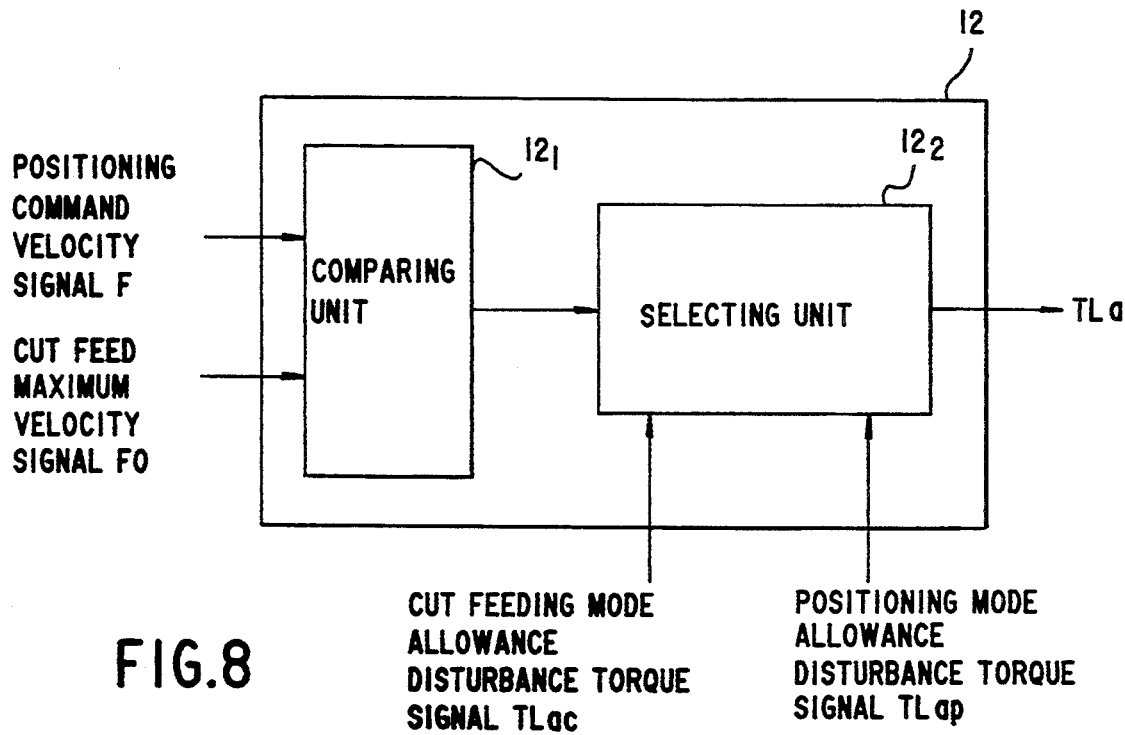
FIG. 8 is a block diagram showing a concrete structural example of a operation mode determination unit according to the first embodiment.
Figure 9:
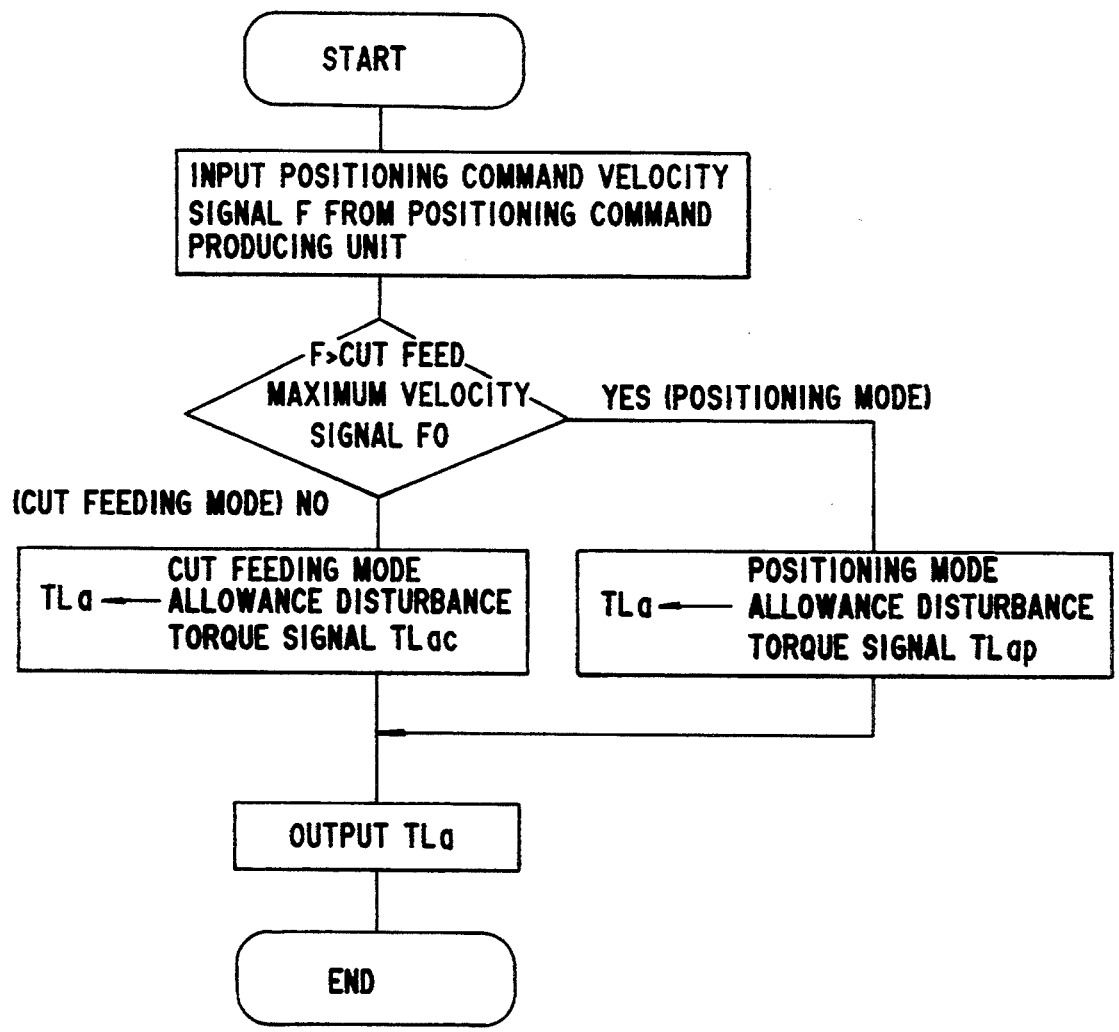
FIG. 9 is a flow chart showing an operational example of the operation mode determination unit according to the first embodiment.

The operation mode determination unit 12 comprises a comparing unit $12_1$ and a selecting unit $12_2$ which works according to a flow chart shown in FIG. 9. Referring to FIG. 8 and FIG. 9, the maximum velocity $F_0$ of the cut feeding is previously set to the comparing unit $12_1$ as a threshold. The comparing unit $12_1$ receives a positioning command velocity signal F from the positioning command producing unit 1. NC device braking the machine tool corresponds a contents of the command within the NC device and determines whether a cut feeding mode or a positioning mode. The comparing unit $12_1$ outputs a signal D2 which is a result of comparing the positioning command velocity signal F with the maximum velocity signal F0 of the cut feeding. The selecting unit $12_2$ selects a cut feeding mode allowance disturbance torque signal TLac or a positioning mode allowance disturbance torque signal TLap and sets the selected one as the allowance disturbance torque signal TLa to the determination unit 10.

Figure 10B:
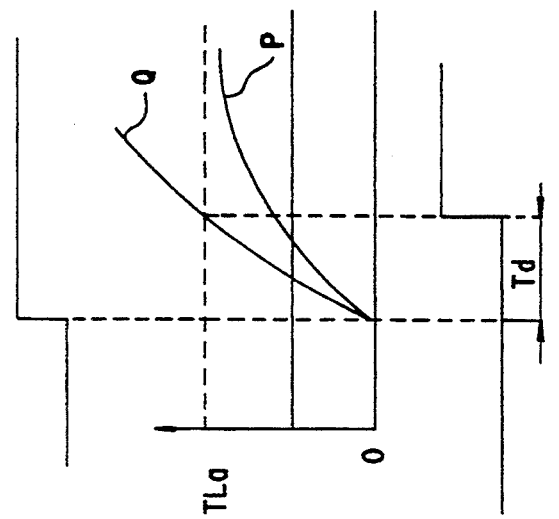
FIGS. 10(A), (B) are time charts showing an operation of the position control device for the servomotor according to the first embodiment.
Figure 10A:
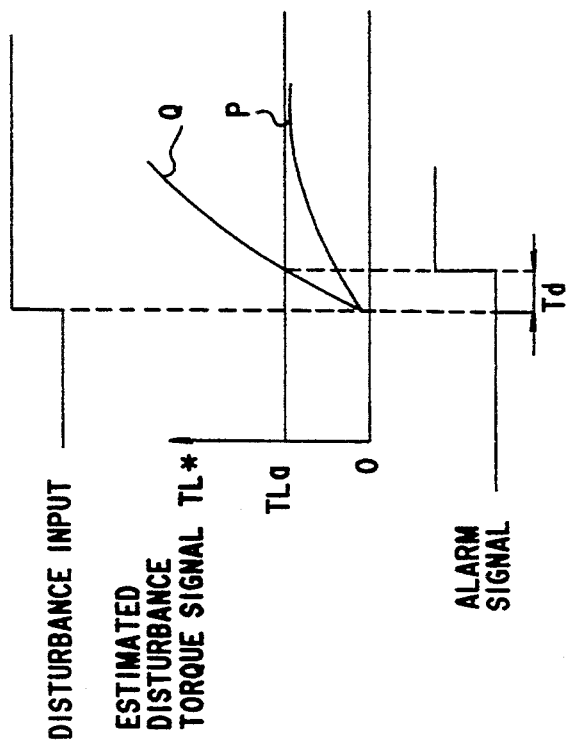
Figure 11:
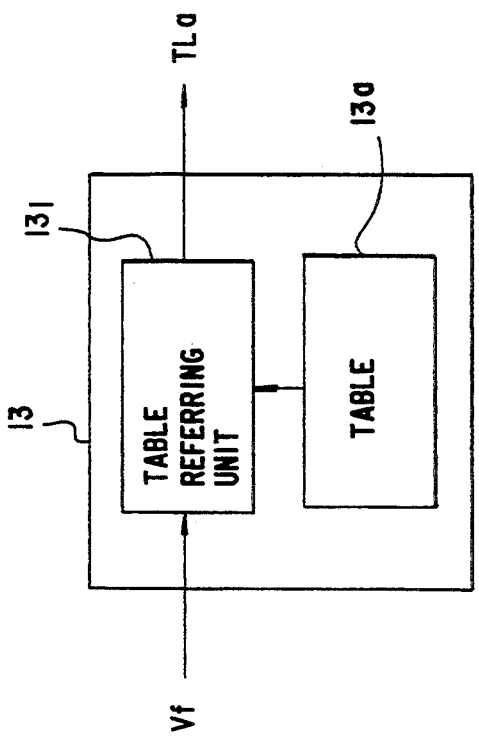
FIG. 11 is a block diagram showing a concrete structural example of an operation mode determination unit according to the second embodiment.

FIGS. 10(A), (B) are time charts showing a relationship between a time response of the disturbance torque signal TL* at the normal time or at the collision in a case of the positioning mode or the cut feeding mode and the allowance disturbance torque signal TLa. In FIGS. 10(A), (B), an axis of abscissa designates time, and an axis of ordinate designates torque. In the figure, P designates a normal value, Q designates a locus of the estimated disturbance torque at a collision, respectively, and outputs the alarm signal when the estimated disturbance torque signal TL* is over the allowance disturbance torque signal TLa. FIG. 10(A) is a case of the positioning mode, and FIG. 10(B) is a case of the cut feeding mode. As the allowance disturbance torque signal TLa is set 10%~20% higher than the normal not to mistake the collision detection in each operation mode, the allowance disturbance torque signal TLa in the positioning mode of FIG. 10(A) can be smaller than one in the cut feeding mode of FIG. 10(B) so as to reduce the time lag of detecting the collision in the positioning mode which the Servomotor rotates at a high speed.

Second Embodiment

Figure 2:
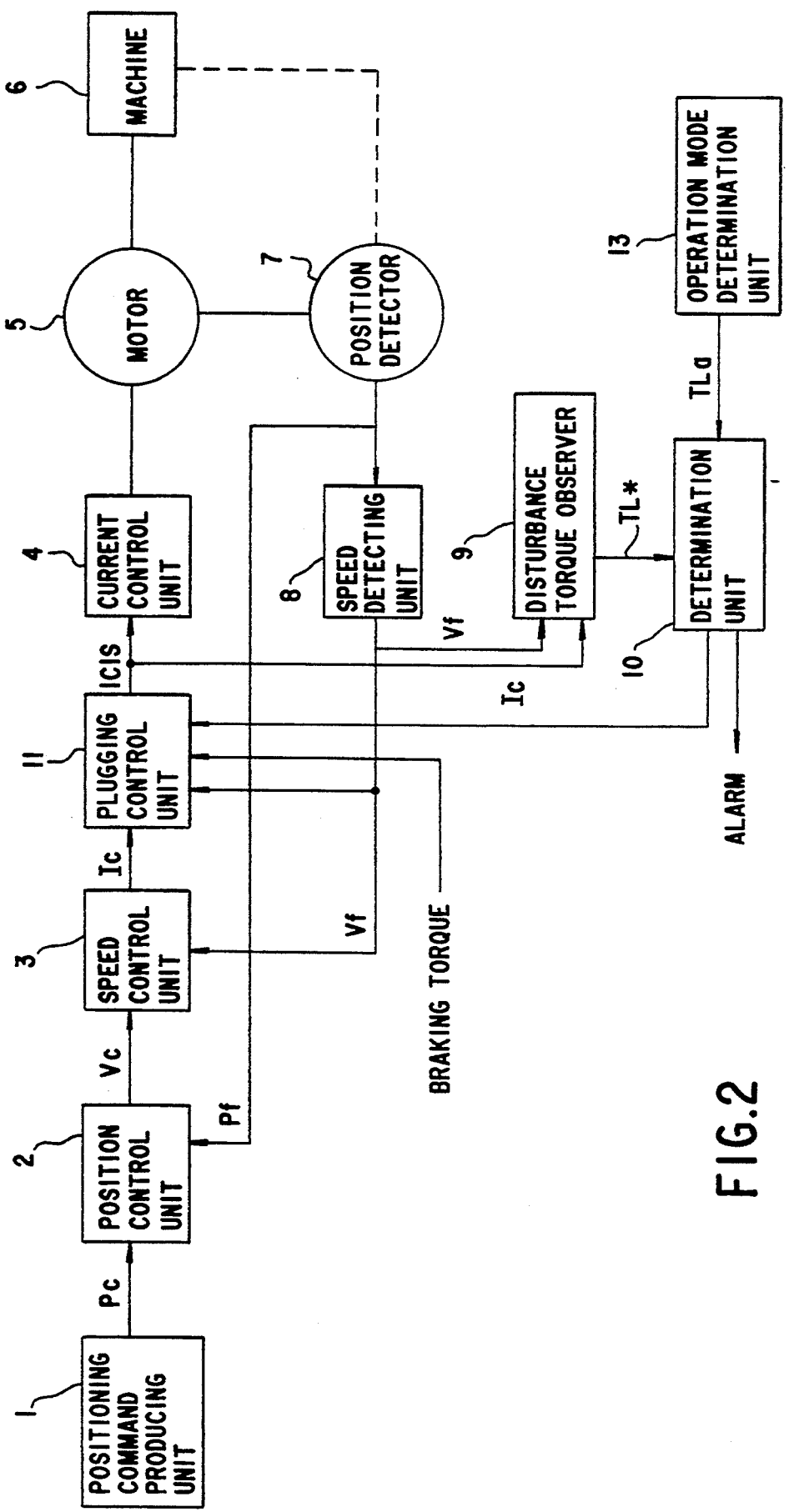
FIG. 2 is a block diagram showing a structure of a position control device for a servomotor according to a second embodiment of the present invention.

FIG. 2 is a block diagram showing a structure of a second embodiment. Referring to FIG. 2, an operation mode determination unit 13 according to the second embodiment receives the servomotor rotational velocity signal Vf outputted from the velocity detecting unit 8 instead of the positioning command velocity signal F from the positioning command producing unit 1.

Figure 12:
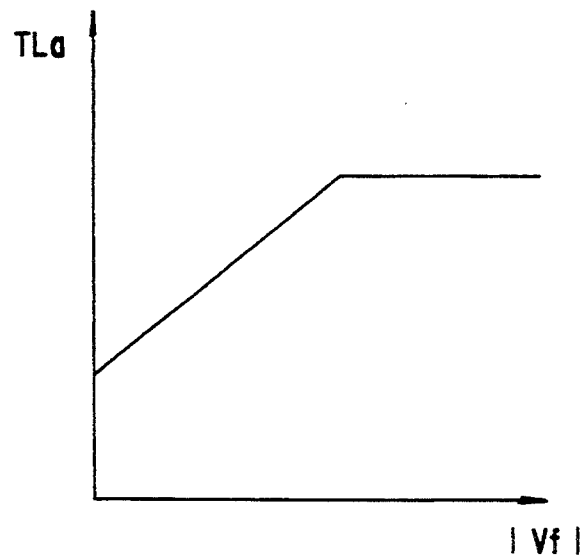
FIG. 12 is a graph showing a characteristic example of a table for the operation mode determination unit according to the second embodiment.
Figure 13:
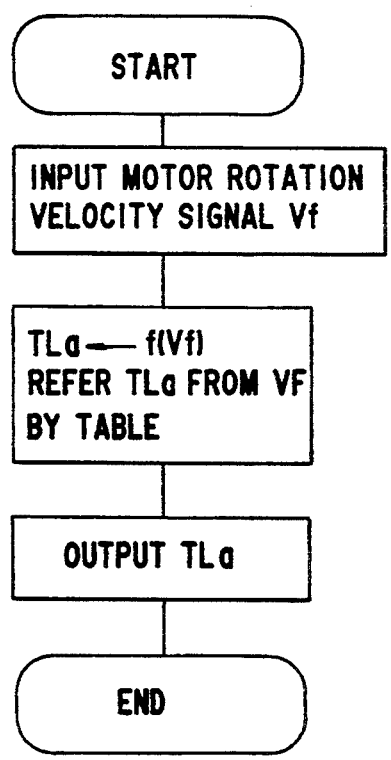
FIG. 13 is a flow char showing an operational example of the operation mode determination unit according to the second embodiment.
Figure 14:
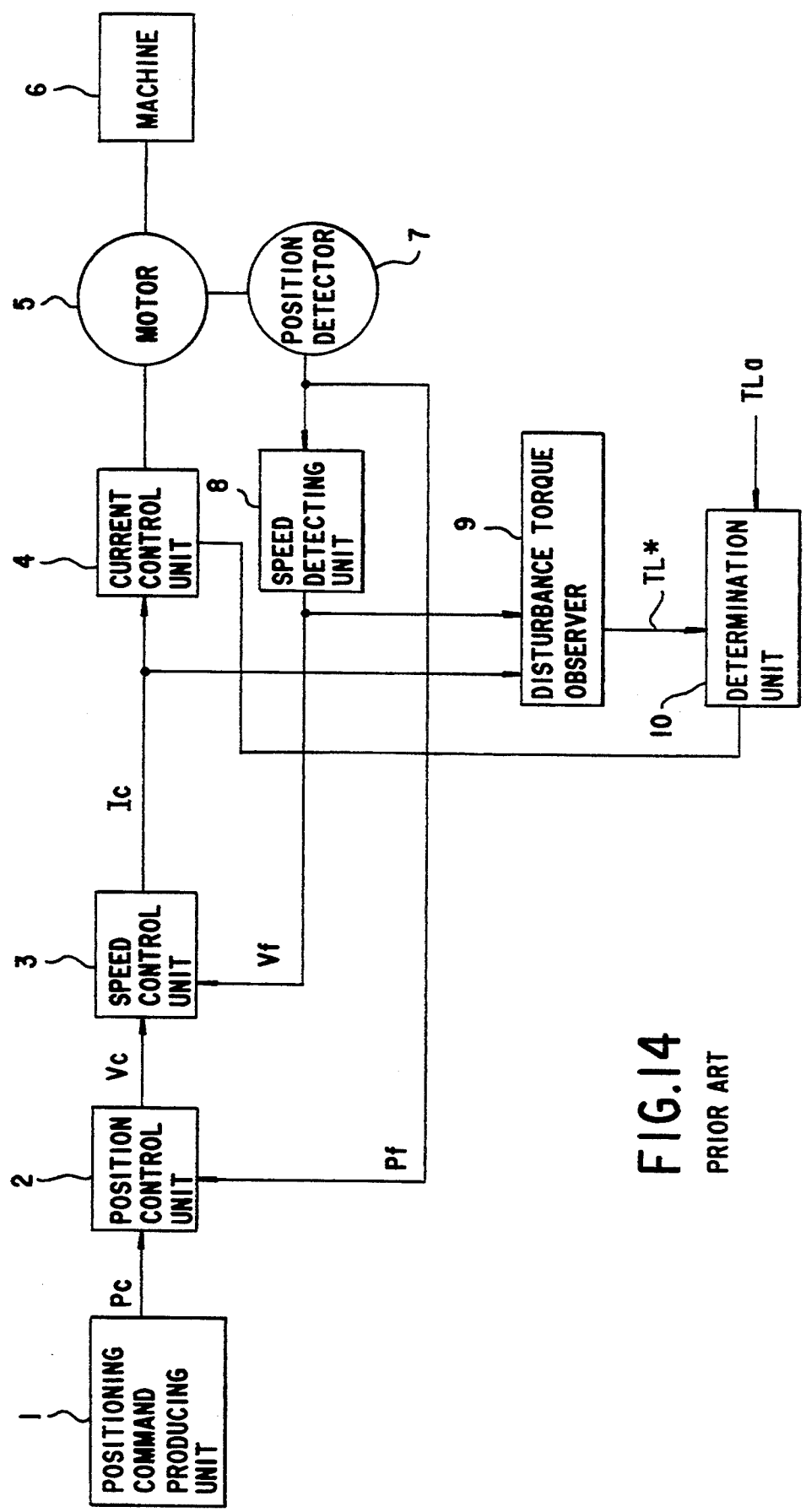
FIG. 14 is a block diagram showing a conventional position control device for a servomotor.
Figure 15:
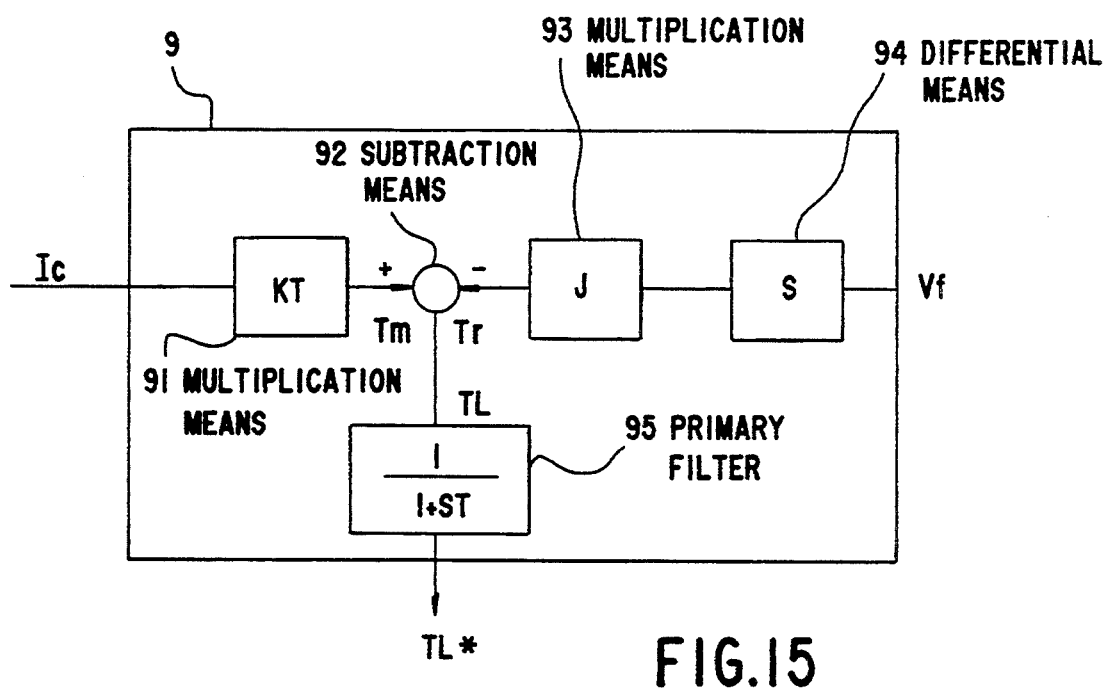
FIG. 15 is a block diagram showing functions of an embodiment of a disturbance torque observer; and, FIG. 16 is a time chart showing an operation of detecting a collision according to a conventional embodiment.
Figure 16:
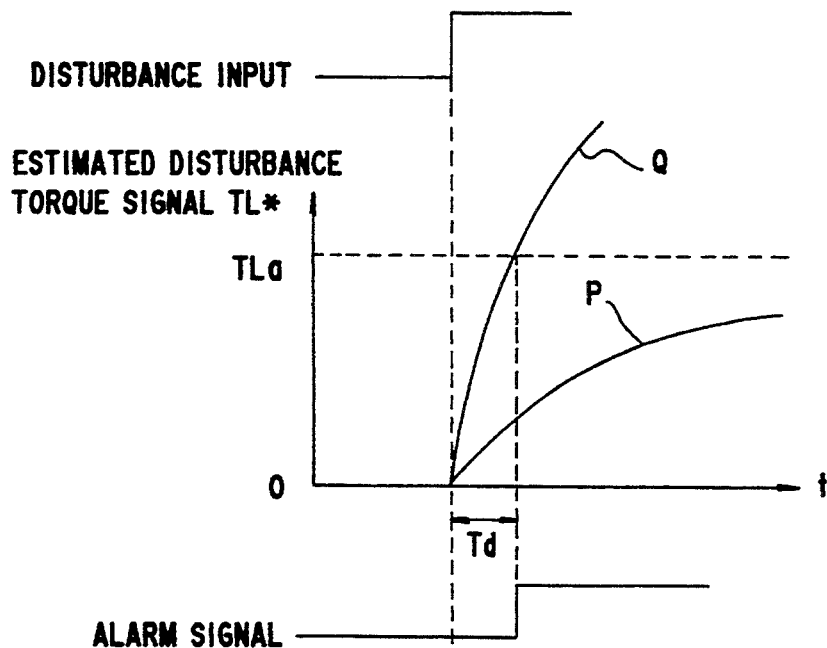

The operation mode determination unit 13 generally has a table referring unit 131 and a table 132 as shown in FIG. 13. The table 132 has, for example, a characteristic as shown in FIG. 12.

Referring to FIG. 2, FIG. 11~FIG. 13, the table referring unit 131 inputted the rotational velocity signal Vf of the servomotor 5 corresponds to the inputted servomotor rotational velocity signal Vf to output the allowance disturbance torque signal TLa corresponding to the servomotor rotational velocity signal Vf to the determination unit 10.

In the second embodiment, the allowance disturbance torque signal TLa can be determined corresponding to the servomotor rotational velocity signal Vf so as to determine the disturbance more in detail.

What is claimed is:

1. A position control device for a servomotor comprising:
   a servomotor;
   a position detecting unit detecting a rotational angle position of said servomotor or a position of a machine driven by said servomotor;
   velocity detecting means for detecting a rotational velocity of said servomotor;
   a positioning command producing unit producing a rotational angle positioning command of said servomotor;
   a velocity control unit controlling the rotational angle position of said servomotor; and
   a current control unit controlling a torque current of said servomotor, wherein said position control device for said servomotor includes:
   a disturbance torque observer receiving a torque current command from said velocity control unit and said rotational velocity signal outputted from said velocity detecting means to estimate a disturbance torque;
   a determination unit outputting an alarm signal when the disturbance torque estimated by said disturbance torque observer is over an allowance disturbance torque previously set; and
   a plugging control unit outputting a braking torque current command instead of a normal current command to said current control unit in a direction of stopping said servomotor until said servomotor is stopped after said alarm signal is inputted.

2. A position control device for a servomotor claimed in claim 1, wherein said determination unit comprises comparing torque means for comparing said allowance disturbance torque previously set with said estimated disturbance torque,
   said plugging control unit having comparing means for comparing the output from said velocity detecting means with a previously set threshold level to determine a rotational direction of said servomotor and for outputting said rotational direction signal; and
   selecting means for outputting a normal current command or a braking current command according to said rotational direction signal.

3. A position control device for a servomotor comprising:
   a servomotor;
   a position detecting unit detecting a rotational angle position of said servomotor or a position of a machine driven by said servomotor;
   velocity detecting means for detecting a rotational velocity of said servomotor;
   a positioning command producing unit producing a rotational angle positioning command of said servomotor;
   a velocity control unit controlling a rotational angle position of said servomotor; and
   a current control unit controlling a torque current of said servomotor, wherein said position control device for said servomotor includes:
   a disturbance torque observer receiving a torque current command from said velocity control unit and said rotational velocity signal outputted from said velocity detecting means to estimate a disturbance torque;
   a determination unit outputting an alarm signal when the disturbance torque estimated by said disturbance torque observer is over an allowance disturbance torque previously set;
   a plugging control unit outputting a braking torque current command instead of a normal current command to said current control unit in a direction of stopping said servomotor until said servomotor is stopped when said alarm signal is inputted; and
   an operation mode determination unit receiving an operation mode of said machine during the operation from said positioning command producing unit to set said allowance disturbance torque corresponding to an operation mode to said determination unit.

4. A position control device for a servomotor claimed in claim 3, wherein said operation mode determination unit comprises comparing means for comparing a previously set threshold level with an operation mode signal outputted from said positioning command producing unit to output a control signal; and
   selecting means for selecting and outputting a positioning mode allowance disturbance torque or cut feeding mode allowance disturbance torque corresponding to said control signal.

5. A position control device for a servomotor claimed in claim 3, wherein said operation mode determination unit receiving said rotational velocity outputted from said velocity detecting means instead of an operation mode from said positioning producing unit to set an allowance disturbance torque corresponding to said rotational velocity to said determination unit.

* * * * *

UNITED STATES PATENT AND TRADEMARK OFFICE
CERTIFICATE OF CORRECTION

PATENT NO. : 5,418,440
DATED      : May 23, 1995
INVENTOR(S): SAKAGUCHI et al.

It is certified that error appears in the above-identified patent and that said Letters Patent is hereby corrected as shown below:

On the cover page, Item [73], please correct the assignee to show joint assignees as follows: --NEC Corporation, Tokyo, Japan; and Hitachi Seiki Co., Ltd., Chiba, Japan--.

Signed and Sealed this

Twenty-sixth Day of September, 1995

Attest:

BRUCE LEHMAN

*Attesting Officer*      *Commissioner of Patents and Trademarks*